US006530558B1

(12) United States Patent
Schulz

(10) Patent No.: US 6,530,558 B1
(45) Date of Patent: Mar. 11, 2003

(54) VALVE FOR METERED INTRODUCTION OF EVAPORATED FUEL INTO AN INTAKE CONDUIT OF AN INTERNAL COMBUSTION ENGINE

(75) Inventor: Wolfgang Schulz, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/806,058

(22) PCT Filed: Jun. 24, 2000

(86) PCT No.: PCT/DE00/02057

§ 371 (c)(1),
(2), (4) Date: Jun. 4, 2001

(87) PCT Pub. No.: WO01/07775

PCT Pub. Date: Feb. 1, 2001

(30) Foreign Application Priority Data

Jul. 27, 1999 (DE) ........................................ 199 35 261

(51) Int. Cl.$^{7}$ ................................................ F16K 31/02
(52) U.S. Cl. .................................................. 251/129.21
(58) Field of Search ....................... 251/129.21, 129.15; 239/585.3

(56) References Cited

U.S. PATENT DOCUMENTS 5,178,116 A * 1/1993 Fehrenbach et al. ... 251/129.21
5,374,029 A * 12/1994 Bailey .................. 251/129.21
5,467,961 A * 11/1995 Sausner et al. ........ 251/129.15
5,503,185 A * 4/1996 Krause .................. 251/129.21
5,560,585 A * 10/1996 Krimmer et al. ...... 251/129.21
6,149,126 A * 11/2000 Krimmer et al. ...... 251/129.21
6,213,413 B1 * 4/2002 Kojima et al. .......... 251/129.21
6,253,789 B1 * 7/2002 Krimmer et al. ...... 251/129.21

* cited by examiner

*Primary Examiner*—Henry C. Yuen
(74) *Attorney, Agent, or Firm*—Ronald E. Greigg

(57) ABSTRACT

A valve for the metered introduction of fuel, evaporated from the fuel tank of an internal combustion engine, into an intake conduit of the engine, having a valve closing member (27), which is disposed between a valve seat body (22) and a magnet core (15) of an electromagnet (13) and which has at least one through opening (28) and is urged in the valve closing direction by a restoring means (31) and is actuatable in the valve opening direction by the electromagnet (13), and having a damping element (60), disposed in the valve closing member (27), which protrudes axially through the valve closing member (27), is characterized in that facing at least one valve opening (25) disposed in the valve seat body (22) is a further opening (29), disposed in the valve closing member (27), which opening is embodied in essentially the same shape as the at least one valve opening (25) but larger than it and is covered, on its face end toward the valve seat body (22), by the damping element (60).

10 Claims, 2 Drawing Sheets

VALVE FOR METERED INTRODUCTION OF EVAPORATED FUEL INTO AN INTAKE CONDUIT OF AN INTERNAL COMBUSTION ENGINE

CROSS-REFERENCE TO RELATED APPLICATIONS

This application is a 35 USC 371 application of PCT/DE 00/02057 filed on Jun. 24, 2000.

BACKGROUND OF THE INVENTION

1. Field of the Invention

The invention relates to metering valves and particularly to such a valve for the metered introduction of fuel that has evaporated from the fuel tank of an internal combustion engine into an intake conduit of the engine, as generically defined by the preamble to claim 1.

2. Brief Description of the Prior Art

One such valve is known from German Patent Disclosure DE 42 44 113 A1, for instance. In this known valve, irritating noise development during valve operation is reduced considerably by at least one damping element. Furthermore, this valve has improved wear resistance, since metal parts moving toward one another are prevented from striking one another, or the impact is at least attenuated.

A marked reduction in irritating secondary noise is already possible with this valve.

Especially in direct-injection gasoline engines that have a relatively high air throughput, however, motor vehicle manufacturers demand further noise abatement in operation of such valves.

OBJECTS AND ADVANTAGES OF THE INVENTION

It is therefore the object of this invention to refine a valve of the generic type for the metered introduction of fuel that has evaporated from the fuel tank of an internal combustion engine into an intake conduit of the engine, in such a way that further minimization of operating noise is possible, even with an increased air throughput through the valve.

The above objects is attained in an improved valve for the metered introduction of fuel evaporated from the fuel tank of an internal combustion engine into an intake conduit of the engine the outset, this object is attained by the characteristics of because at least one further opening of essentially the same shape as the valve opening and larger than it is opposite the at least one valve opening in the valve closing member and is covered, on its side toward the valve seat body, by the damping element, the damping element on its sealing face disposed in the region of the valve opening has an elastic bearing face, which elastic bearing face resiliently damps the impact of the valve closing member on the sealing face of the valve opening in the valve seat body. As a result, especially effective minimization of operating noise is possible.

In an advantageous embodiment, it is provided that the end face, toward the valve seat body, of the valve closing member is at least partly covered already by the damping element. This enables large-area, highly adherent fastening of the damping element to the valve closing member.

The damping element advantageously protrudes through the at least one further opening and, on the second end face toward the electromagnet, it forms a hump-like sealing face, which at least partly follows the boundary line of the at least one further opening disposed in it. This arrangement not only enables especially simple fastening of the damping element to the valve closing member. In particular, this arrangement also makes it possible for the damping element to be disposed on both face ends of the valve closing member, thus preventing metal-to-metal contact of the valve closing member with the valve seat body or with a sealing face disposed on the electromagnet, upon impact with it.

The damping element is preferably of an elastomeric material. For instance, it can be of rubber, which is vulcanized onto the face end, toward the valve seat body, of the valve closing member and is vulcanized in the at least one further opening and performs not only the damping function but also a sealing function.

BRIEF DESCRIPTION OF THE DRAWINGS

The foregoing and other features and advantages of the invention will be apparent from the detailed description contained herein below, taken with the drawings, in which:.

DESCRIPTION OF AN PREFERRED EMBODIMENT

Figure 1:
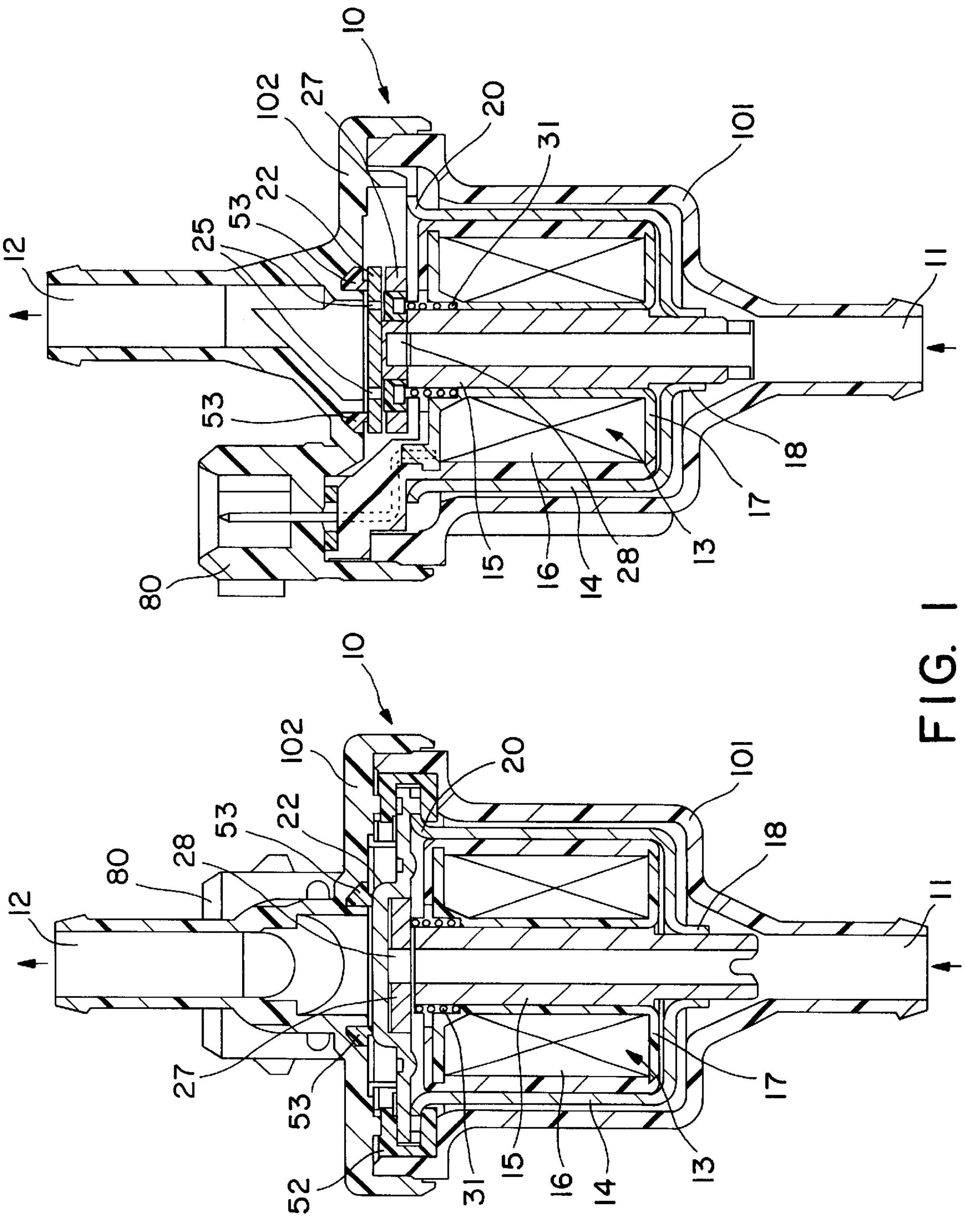
FIG. 1 is two sectional views of a valve, which makes use of the invention, in directions perpendicular to one another.

A valve for metered admixing of fuel, evaporated from the fuel tank of a mixture-compressing internal combustion engine with externally supplied ignition, with a fuel delivered directly to the engine via an intake conduit or in the case of direct gasoline injection directly into an engine cylinder, shown in FIG. 1 and hereinafter called a tank venting valve, is part of a fuel vapor trapping system, not shown in further detail, of the internal combustion engine. The design and function of such fuel vapor trapping systems can be learned for instance from "Bosch Technische Unterrichtung Motor Management Motronic", 2nd Ed., August 1993, pages 48 and 49 (Bosch Technical Instruction: Motronic Engine Management). A tank venting valve and its function are disclosed for instance in German Patent Disclosures DE 42 44 113 A1 and DE 196 11 886 A1, which are hereby incorporated by reference.

The tank venting valve has a two-part valve housing 10 with a cup-shaped housing part 101 and a cap-shaped housing part 102 that closes it off. The cup-shaped housing part 101 has an inflow neck 11 for connection to a venting neck of the fuel tank or to a reservoir, filled with activated charcoal, for the evaporated fuel connected downstream of the fuel tank. The housing part 102 has an outflow neck 12 for connection to the intake conduit of the engine and also has an electrical contact element, such as a bush 80, for connection of an electric line for an electromagnet 13. The inflow neck 11 and the outflow neck 12, essentially aligned with one another, are each disposed axially in the housing parts 101, 102. The electromagnet 13 is disposed in the interior of the cup-shaped housing part 101.

The electromagnet 13 has a cup-shaped magnet housing 14 with a coaxial, hollow-cylindrical magnet core 15 that penetrates the cup bottom and with a cylindrical exciter coil 16, which is seated on a coil carrier 17 that surrounds the magnet core 15 in the magnet housing 14. An outward-protruding threaded neck 18 with a female thread is embodied on the bottom of the magnet housing 14 and is screwed to a male-threaded portion of the hollow-cylindrical magnet core 15. By rotation in the magnet housing 14, the magnet core 15 can thus be displaced axially for adjustment purposes. The magnet core 15 is aligned with the inflow neck 11, so that the evaporated fuel flowing in here flows directly through the magnet core 15.

The rim of the magnet housing 14 is bent outward to form an annular bearing flange 20, on which a valve seat body 22 that covers the magnet housing 14 rests, forming the short-circuit or annular gap yoke of the electromagnet 13. The valve seat body 22 is supported in damped form in the housing part 101 and the housing part 102 via damping elements 53, which are for instance of rubber, and is pressed onto the bearing flange 20 by damping elements 52, 53, which peripherally surround it, and by the cap-shaped housing part 102. As a result, on the one hand the transmission of structurally borne sound to the valve housing 10 is reduced, and on the other, the damping elements 52, 53 at the same time perform a sealing function as well.

Figure 2:
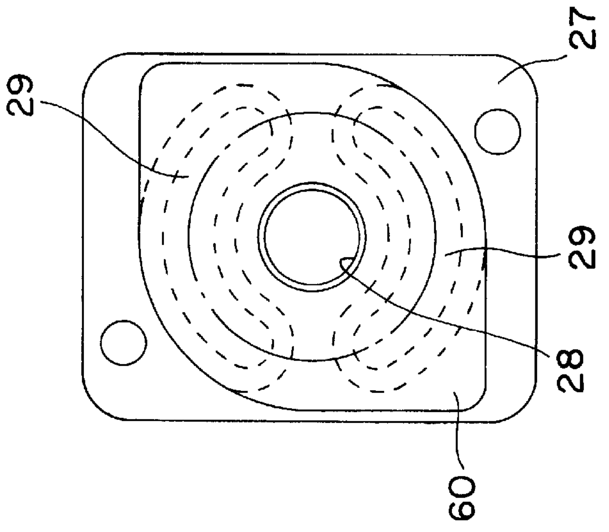
FIG. 2 is a front view of a valve closing member used in the valve shown in FIG. 1.
Figure 3:
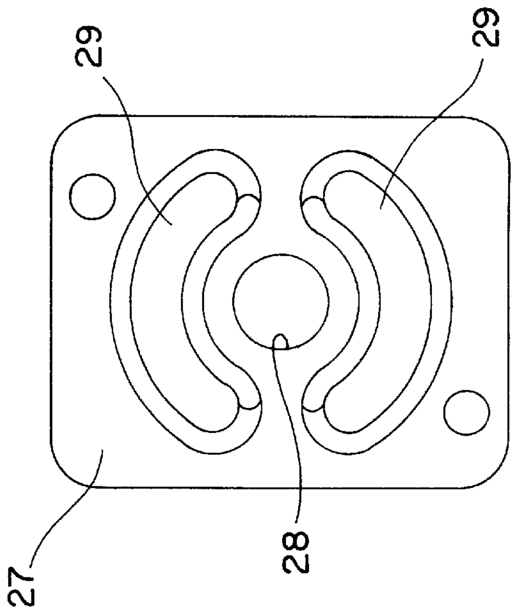
FIG. 3 is a view from below of the valve closing member shown in FIG. 2.
Figure 4:
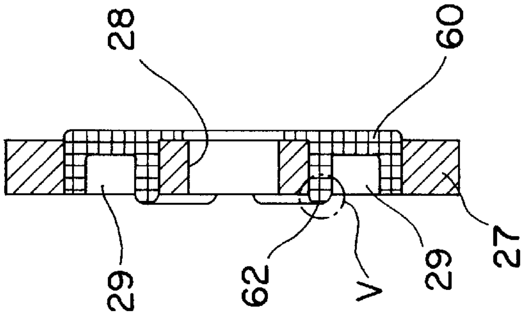
FIG. 4 is a sectional view of the valve closing member shown in FIG. 2.
Figure 5:
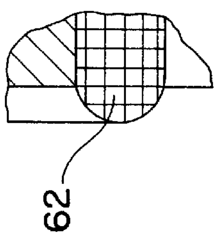
FIG. 5 is an enlarged detail marked V in FIG. 4.

In the short-circuit yoke forming the valve seat body 22, there are two valve openings 25, for instance of the shape of a segment of a circle, which can be closed by means of a valve closing member 27 disposed between the valve seat body 22 forming the short-circuit yoke and the magnet core 15. As seen particular in FIG. 2 through FIG. 4, an axial through opening 28 is provided centrally in the valve closing member 27, coaxially with the hollow-cylindrical magnet core 15, and through this through opening, evaporated fuel arriving from the inflow neck 11 can reach the outflow neck 12, when the valve openings 25 of the valve seat body 22 are open.

The valve closing member 27, made from magnetically conductive material, is urged in the valve closing direction, in the direction of the outflow neck 12, by a restoring means in the form of a valve closing spring 31. The valve closing spring 31 is braced on one end on the valve closing member 27 and on the other on a tubular end of the magnet core 15.

As seen especially from FIG. 2 through FIG. 5, in the valve closing member 27 there are two further openings 29, which have essentially the same elongated, split-ring-shaped form of the valve openings 25 embodied in the valve seat body 22, but are embodied as larger than the latter. An elastomeric damping element, for instance in the form of a sealing rubber 60, is vulcanized on, on its face end toward the valve seat body 22, in the region of these further openings 29; it protrudes through the further openings 29, and on the second face end of the valve closing member 27, toward the core 15, it has a hump-shaped sealing face 62, which at least partly follows a boundary line of the further openings 29. By means of the further openings 29, which are embodied as slightly larger than the valve openings 25 in the valve seat member 22 and are covered by the damping element 60, the impact of the valve closing member 27, acting as an armature, against the sealing face of the valve opening 25 in the valve seat member 27 is damped, because of the thus elastically resiliently embodied bearing faces of the damping element 60. The result is a substantial minimization of noise. Upon opening of the valve, the impact of the valve closing member 27 on the magnet core 15 is likewise damped by the sealing face 62, protruding in hump-like fashion and disposed in the region of the further opening 29. The projection of the hump-like sealing face 62 past the second end face of the valve closing member 27 is designed such that the magnet force, after the impact of the valve closing member 27 on the magnet core 15, "compresses" the hump-like sealing face 62, and the valve closing member 27 comes into contact with the magnet core 15 with metal-to-metal contact. This has the advantage that the opening and closing stroke of the valve closing member 27, and thus also the flow cross sections formed between the valve closing member 27 and the valve openings 25, remain constant. Since the valve closing member 27 is provided on both of its face ends with the damping element, upon impact a metal-to-metal contact between the magnet core 15 and the annular gap yoke acting as a valve seat body 22 in cyclical operation is avoided.

It is especially advantageous that the damping element 60, for instance made of rubber, in the exemplary embodiment described above can be very thin-walled, which is necessary in the event of subjection to fuel, so as to avoid major swelling in the sealing mode.

The foregoing relates to preferred exemplary embodiments of the invention, it being understood that other variants and embodiments thereof are possible within the spirit and scope of the invention, the latter being defined by the appended claims.

I claim:

1. A valve for the metered introduction of fuel which has evaporated from the fuel tank of an internal combustion engine into the engine, the valve having a valve closing member (27) disposed between a valve seat body (22) and a magnet core (15) of an electromagnet (13) and which has at least one through opening (28) and is urged in the valve closing direction by a restoring means (31) and is actuatable in the valve opening direction by the electromagnet (13), and having a damping element (60), disposed in the valve closing member (27), which protrudes axially through the valve closing member (27), the improvement comprising a further opening (29) facing at least one elongated, split-ring-shaped valve opening (25) disposed in the valve seat body (22), the further opening (29) being disposed in the valve closing member (27) and being embodied in essentially the same elongated, split-ring-shaped form as, but larger than, the at least one valve opening (25) and being covered, on its face end toward the valve seat body (22), by the damping element (60), which is embodied in an U-shaped form having a bottom facing the at least one valve opening (25) and sides extending into the further opening (29).

2. The valve of claim 1, wherein the end face, toward the valve seat body (22), of the valve closing member (27) is at least partly covered already by the damping element (60).

3. The valve of claim 1, wherein the damping element (60) protrudes through the at least one further opening (29) and, on the face end toward the electromagnet (13) of the valve closing member (27), has a hump-like sealing face, which at least partly follows the boundary line of the at least one further opening (29).

4. The valve of claim 1, wherein the damping element (60) comprises an elastomeric material.

5. The valve of claim 4, wherein the damping element is a sealing rubber, which is vulcanized both onto the face, toward the valve seat body (22), of the valve closing member (27) and onto the boundary wall of the at least one further opening (29).

6. The valve of claim 2, wherein the damping element (60) protrudes through the at least one further opening (29) and, on the face end toward the electromagnet (13) of the valve closing member (27), has a hump-like sealing face, which at least partly follows the boundary line of the at least one further opening (29).

7. The valve of claim 2, wherein the damping element (60) comprises an elastomeric material.

8. The valve of claim 3, wherein the damping element (60) comprises an elastomeric material.

9. The valve of claim 7, wherein the damping element is a sealing rubber, which is vulcanized both onto the face, toward the valve seat body (22), of the valve closing member (27) and onto the boundary wall of the at least one further opening (29).

10. The valve of claim 8, wherein the damping element is a sealing rubber, which is vulcanized both onto the face, toward the valve seat body (22), of the valve closing member (27) and onto the boundary wall of the at least one further opening (29).

* * * * *